Jan. 25, 1938. E. R. FITCH ET AL 2,106,480
FLUID PRESSURE BRAKE
Filed Oct. 23, 1936 2 Sheets-Sheet 1

INVENTOR
ELLERY R. FITCH
GLENN T. McCLURE
BY Wm. M. Cady
ATTORNEY

Patented Jan. 25, 1938

2,106,480

UNITED STATES PATENT OFFICE 2,106,480

FLUID PRESSURE BRAKE

Ellery R. Fitch, Irwin, and Glenn T. McClure, McKeesport, Pa., assignors to The Westinghouse Air Brake Company, Wilmerding, Pa., a corporation of Pennsylvania Application October 23, 1936, Serial No. 107,212

21 Claims. (Cl. 303—23)

This invention relates to fluid pressure brake equipment which is adapted to be changed over or conditioned to meet the braking requirements of each of a plurality of classes of railway train service, such for instance, as passenger, express and freight train service, and relates more particularly to that type of equipment disclosed in the pending applications of Clyde C. Farmer and Ellis E. Hewitt, Serial No. 743,546, filed September 11, 1934, and Serial No. 94,372, filed August 5, 1936.

To meet the braking requirements of the several classes of railway train service above mentioned, this type of fluid pressure brake equipment is adapted to be changed over or conditioned for different classes of railway train service by means of either a manually operative change-over valve device such as is shown in the above mentioned Farmer and Hewitt application, Serial No. 743,546 or by means of an automatically operative change-over valve device of the type shown in the above mentioned Farmer and Hewitt application, Serial No. 94,372, filed August 5, 1936. Other automatically operative change-over valve devices such as shown in a pending application of Clyde C. Farmer and Ellis E. Hewitt, Serial No. 747,734, filed October 10, 1934 and in the patent of Clyde C. Farmer, No. 2,035,056 may be employed.

In each of the aforementioned classes of train service, to insure the prompt movement of the triple valve parts to service position and to propogate such movement throughout the length of the train, the equipment disclosed in the above mentioned pending application, Serial No. 743,546 is provided with means for effecting local quick service reductions in brake pipe pressure. The quick service venting means employed in the equipment is adapted to function in each class of train service to effect an initial quick service reduction in brake pipe pressure upon movement of the auxiliary valve of the triple valve device relative to the main valve when the brake pipe pressure is reduced to initiate an application of the brakes. Following this quick service reduction in brake pipe pressure the movable parts of the triple valve device will move to brake application position in which a further quick service venting of fluid under pressure from this brake pipe occurs.

In passenger train service, in order to provide the desired flexibility and smoothness of control of trains it is essential that the fluid pressure brake equipment on the cars of the train be capable of operation to effect a graduated release of the brakes. In express and freight train operation the graduated release feature prohibitively slows up the release of the train brakes. Furthermore, cars having the graduated release feature cannot be operated in the middle or rear portion of either express or freight trains without undesirable release graduations occurring when a direct release of the brakes is desired. From this it will be apparent that a fluid pressure brake equipment to be suitable for use in passenger, express and freight train service should be capable of being conditioned or changed-over to provide the graduated release features for passenger train service and should also be capable of being conditioned or changed-over to annul or eliminate the graduated release features for express and freight train service.

In the aforementioned pending application of Clyde C. Farmer and Ellis E. Hewitt, Serial No. 743,546, an equipment is shown and described which embodies the quick service, graduated release and change-over features above referred to. Although not shown, the equipment disclosed in the aforementioned pending application of Clyde C. Farmer and Ellis E. Hewitt, Serial No. 94,372, is intended to embody the quick service features above referred to.

To graduate the release of the brakes on a train, the brake pipe pressure is restored in steps or increments by moving the engineer's brake valve device back and forth between either release or running position and lap position. It is well known that when the brake valve device is moved to release or running position to initiate a release of the brakes, the brake pipe and associated parts of the equipment on the cars at the head end of the train will be charged to a higher pressure than on the cars at the rear end of the train, and that when the brake valve device is moved from either of these positions to the lap position, in which the supply of fluid under pressure to the brake pipe is cut off, there will be a continued flow of fluid from the front end of the train toward the rear of the train, in other words, the brake pipe pressure on the front end of the train tends to equalize toward the rear end of the train. This of course causes a reduction in brake pipe pressure on the cars at the front end of the train which, with reference to the type of equipment shown in the aforementioned applications Serial No. 743,546 and Serial No. 94,372, may in some instances be great enough to cause the triple valve piston and thereby the associated auxiliary slide valve to move to initial quick service position even though such movement is resisted by the stabilizing mechanism which is shown in application Serial No. 743,546 and which may be embodied in the triple valve device.

The principal object of the present invention is to provide a fluid pressure brake equipment of the above mentioned type with means operative when the equipment is conditioned for passenger train service for closing the initial quick service venting communication upon effecting an application of the brakes and for maintaining this communication closed until such time as the brake cylinder pressure is reduced to a low degree, say for instance to around five pounds, so as to prevent the local quick service venting of fluid from the brake pipe when, in graduating the release of the brakes, the movable parts of the triple valve device unintentionally assume their initial quick service venting position.

Other objects and advantages will apear in the following more detailed description of the invention.

In the accompanying drawings.

Figure 1:
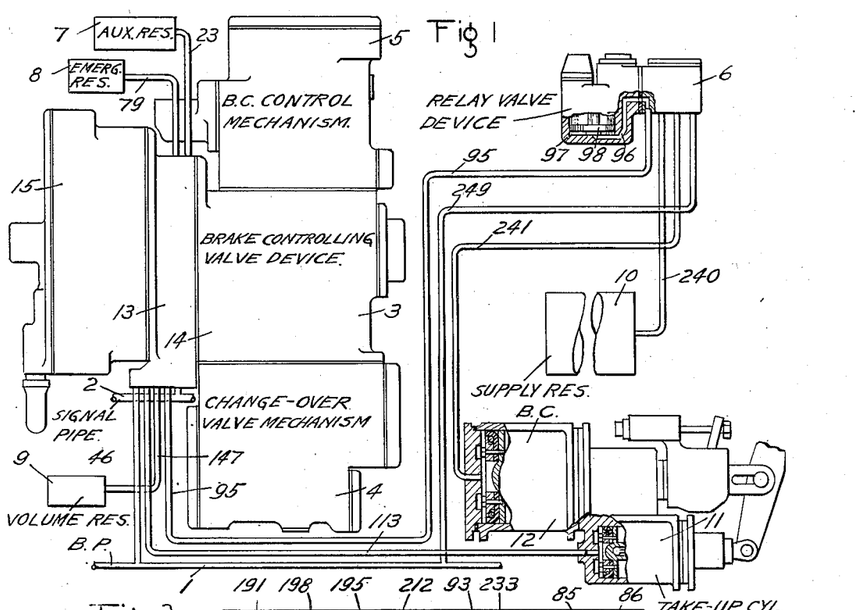
Fig. 1 is a diagrammatic view of a fluid pressure brake equipment embodying the invention.

As shown in the drawings the equipment may comprise a brake pipe 1, a signal pipe 2, a brake controlling valve device 3, a change-over valve mechanism 4, a brake cylinder control valve mechanism 5, a relay valve device 6, an auxiliary reservoir 7, an emergency reservoir 8, a volume reservoir 9, a supply reservoir 10, a take-up cylinder device 11 and a brake cylinder 12.

The several parts of the equipment which have just been enumerated may be substantially the same in construction and operation as the corresponding parts of the equipment disclosed in the aforementioned pending application Serial No. 94,372, with but one exception, namely, the brake cylinder control mechanism 5 which embodies the additional feature of controlling the initial quick service communication leading from the brake pipe to the usual quick service chamber and atmosphere, so that when the equipment is conditioned for passenger train service there will be no local quick service venting of fluid from the brake pipe when, in effecting a graduated release of the brakes, the movable parts of the brake controlling valve device accidentally move to initial quick service position, all of which will hereinafter more fully appear.

As shown the brake controlling valve device may comprise a pipe bracket 13 to one side of which is clamped the casing of a triple valve device 14 and to the opposite side of which is clamped the casing of an emergency valve device 15.

The casing of the triple valve device has formed therein a piston chamber 16 containing a piston 17 having a stem 18 adapted to operate a main slide valve 19 and an auxiliary slide valve 20 contained in a valve chamber 21 which is connected to the auxiliary reservoir 7 through a passage 22 and a passage and pipe 23.

The piston stem, at a point located a short distance inwardly from the rear end, is provided with a shoulder 24 which is adapted to engage a rear end surface 25 of the main slide valve 19.

The rear end portion of the piston stem 18 is provided with a bore 26 which is closed at one end by a plug 27 having screw-threaded connection with the stem, said plug being provided with a central bore 28. Below the lower surface of the major portion of the piston stem, the other end of the bore 26 is open. The inner end wall of the bore 26 forms a stop shoulder adapted to be engaged by a plunger 29 which is in slidable engagement with the piston stem within the bore 26. The plunger is provided with a stem 30 which is slidably guided by the plug 27 within the bore 28. Interposed between and engaging one side of the plunger 29 and plug 27 is a spring 31 which acts to normally maintain the plunger in engagement with the end wall of the bore 28. In this position, the face of the plunger will be closer to the rear surface 25 of the main slide valve 19 than will be the outer face of the shoulder 24 of the piston stem, so that in effecting an application of the brakes, the plunger will engage the main slide valve and yieldably resist movement of the piston and auxiliary slide valve relative to the main slide valve before the shoulder 24 of the stem engages the main slide valve. The purpose of this is to stabilize the action of the equalizing valve parts, as will hereinafter more fully appear.

The construction of the emergency valve device 15 may be identical with that of the emergency valve device shown and described in the aforementioned pending application of Clyde C. Farmer and Ellis E. Hewitt, Serial No. 743,546 and may have substantially the same operating characteristics. In view of this, the details of construction and the operating characteristics of the equipment which correspond with those of the equipment disclosed in said applications have, for the most part, been omitted from the present application so as to simplify the showing and the description of the invention.

As shown, the casing of the emergency valve device has formed therein a piston chamber 32 containing a piston 33 having a stem 34 adapted to operate a main slide valve 35 and an auxiliary slide valve 36 contained in a chamber 37 which is connected by way of a passage 38 to a quick action chamber 39 which is formed in the pipe bracket 13.

The rear end portion of the emergency piston stem 34 carries a mechanism which is quite similar in construction to the stabilizing mechanism carried by the rear end portion of the triple valve piston stem 18, and comprises a plunger 40 which is subject to the pressure of a spring 41 interposed between and engaging the plunger and a plug 42 having screw-threaded connection with the piston stem 34. This plunger is movable a limited distance relative to the stem 34 and is slidably guided within a bore 43 provided in the stem, and has a stem 44 which is slidable within a bore 45 provided in the plug 42. This mechanism is adapted to cooperate with the main slide valve 35 to stabilize the movement of the emergency valve parts in effecting applications of the brakes and is also adapted to cooperate with the main slide valve to assist in shifting the emergency piston 33 and auxiliary slide valve 36 toward release position in releasing the brakes after an emergency application.

The brake pipe 1 is in communication with both the equalizing piston chamber 16 and the emergency piston chamber 32 by way of a branch pipe and passage 46 and a passage 47.

The change-over valve mechanism 4 is identical in most respects with the corresponding device of the aforementioned Farmer and Hewitt application, Serial No. 94,372 and comprises a casing 48, which, in the present embodiment of the invention, is secured to the casing of the triple valve device and comprises a change-over valve device and a change-over control valve device for controlling the operation of the change-over valve device.

The change-over control valve device just referred to comprises spaced movable abutments which, in the present embodiment of the invention, are in the form of flexible diaphragms 49 and 50, the diaphragm 49 having a greater face area than the diaphragm 50. At the outer or face side of the diaphragm 49 there is a chamber 51 which is constantly in communication, through a passage and pipe 52, with the signal pipe 2. Leading from the passage 52 to the face of a slide valve seat 53 of the casing 48 is a branch passage 54. At the outer or face side of the diaphragm 50 there is a chamber 55 which is connected to a passage 56 leading to the face of the slide valve seat 53.

Between the diaphragms 49 and 50 there is a chamber 57 which is in constant communication with the atmosphere by way of passage 58. Contained in this chamber 57 is a longitudinally movable stem 59 which is operatively engaged at one end by the diaphragm 49 and which is adapted to operate a slide valve 60 also contained in the chamber and slidably engaging the slide valve seat 53, said slide valve being maintained in close engagement with the seat by means of a spring weighted rockable strut 61 which is interposed between the casing and the back of the slide valve.

There is also contained in the chamber 57 a mechanism which, as will hereinafter more fully appear, is subject to the action of the diaphragm 49 to control the operation of the stem 59 and consequently the slide valve 60, said mechanism comprising a combined spring seat and stop member 62 which is preferably arranged in longitudinal alignment with the stem 59 and which, at its left hand end, is in operative engagement with the diaphragm 50, said member being movable in the direction of its length and having a guide collar 63 which is slidably guided in a bushing 64 secured to the casing. This member 62 also has a stem 65 on which there is slidably mounted a movable stop 66 which is adapted to be engaged by an annular spring seat 67 interposed between the stop 66 and stem 59 and slidably guided by the casing.

Interposed between and operatively engaging the guide collar 63 and the movable stop 66 is a coil spring 68, and interposed between and operatively engaging the spring 67 and a spring seat 69 contained in the chamber 57 and abutting the inner end of the bushing 64 is a coil spring 70 which surrounds the spring 68. Movement of the spring seat 67 toward the right by the action of the spring 70 is adapted to be limited by an annular stop shoulder 71 which may be integral with the casing and which extends into the path of travel of the spring seat. Movement of the stop 66 toward the right by the action of the spring 68 is limited by means of an annular collar or snap ring 72 which is secured to the stem 65.

The change-over valve device comprises spaced pistons 73, 74, which are rigidly connected together by means of a piston stem 75 which is adapted to shift a slide valve 76 to one or another of two change-over or conditioning positions, said valve being contained in a chamber 77 located between the pistons and constantly connected to the emergency reservoir 8 through a passage 78 and a passage and pipe 79. This valve chamber is constantly connected to a control passage 80 leading to the face of the slide valve seat 53 of the change-over control valve device.

At the face side of the piston 73 there is a chamber 81 which is connected to a control passage 82 leading to the control slide valve seat 53, and at the face side of the piston 74 there is a chamber 83 which is connected to a control passage 84 leading to said slide valve seat 53.

Contained in a chamber 85 of the casing of the change-over valve mechanism 4 is a brake cylinder build-up control valve 86 which is adapted to be operated by a flexible diaphragm 87. At the right hand or face side of the diaphragm there is a chamber 88 which is connected to a passage 89 leading to the face of the control slide valve seat 53. The valve 86 is adapted to seat on an annular seat rib 90 formed on the casing and when so seated, the portion of the face of the valve which is within the seat rib is connected through a passage 91 to a passage 92 leading to the seat of the change-over slide valve and to the brake cylinder control valve mechanism 5 as will hereinafter more fully appear. The portion of the face of the valve which is on the outside of the valve is connected through a restricted passage 93 to a passage 94 leading to a pipe 95 which is connected through a passage 96 to the piston chamber 97 on the face side of the piston 98 of the relay valve device 6.

The relay valve device 6 is provided for the purpose of controlling the supply of fluid under pressure from the supply reservoir 10 to the brake cylinder 12 and the release of fluid under pressure from the brake cylinder and is further for the purpose of controlling the charging of the supply reservoir with fluid under pressure from the brake pipe. This relay valve device may be identical with the corresponding device fully shown and described in the aforementioned pending application, Serial No. 743,546 and in view of this a detailed description here of the device is deemed unnecessary.

The brake cylinder control valve mechanism 5 is provided for the purpose of cutting the relay valve device 6 into action when the pressure of fluid in the take-up brake cylinder has been increased a predetermined amount as will hereinafter more fully appear, and may comprise a control valve device and a pilot valve device.

The control valve device may comprise a piston 99 which is contained in a chamber 100 and which is subject to the pressure of a coil spring 101 contained in this chamber. The piston 99 is provided with a stem 102 which is adapted to operate a slide valve 103 contained in a chamber 104 which is connected through a passage 105 to the auxiliary reservoir passage 23.

Figures 2, 5:
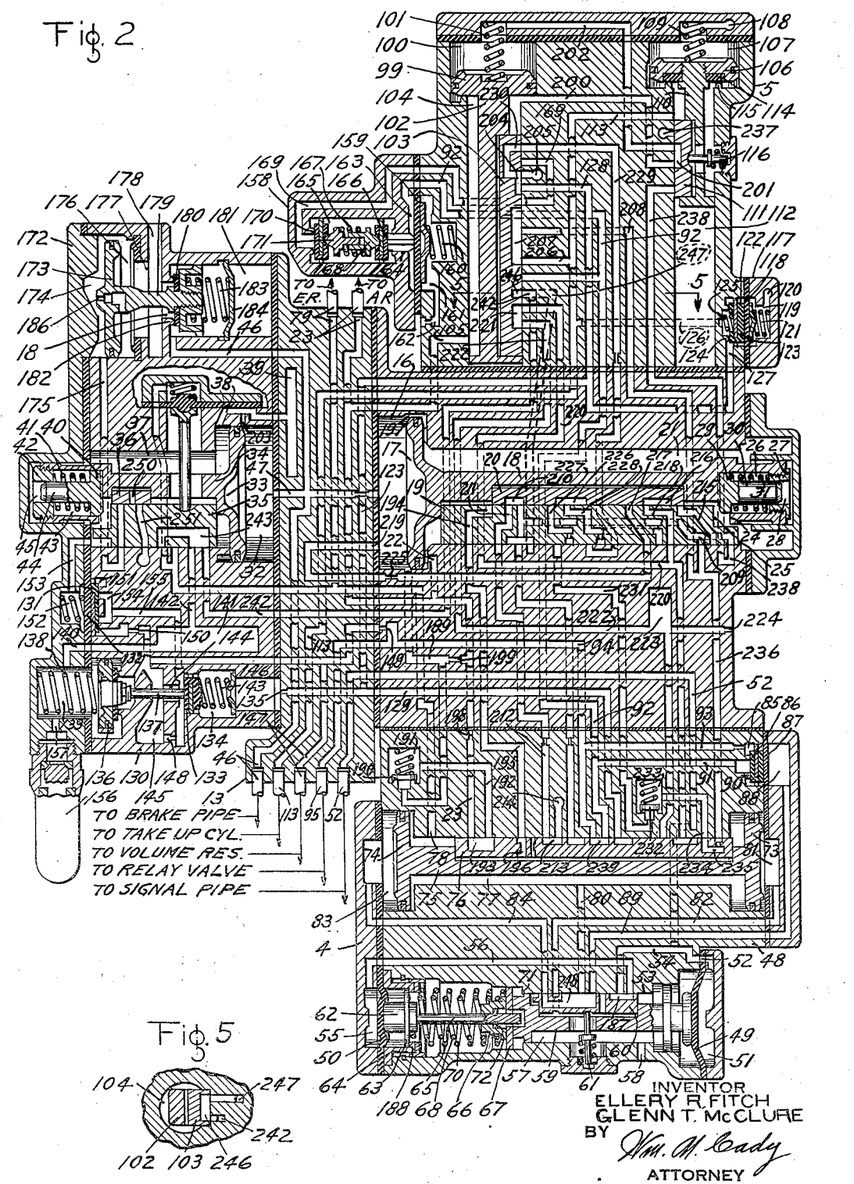
Fig. 2 is an enlarged diagrammatic sectional view of a portion of the equipment, the change-over valve mechanism being shown in position for conditioning the equipment for passenger train service.
Fig. 5 is a fragmentary detail sectional view taken on the line 5—5 of Fig. 2.

The pilot valve device of the brake cylinder control valve mechanism 5 may comprise a piston 106 which is contained in a chamber 107 connected to a passage 108 leading to the atmosphere. This piston 106 is subject to the pressure of a coil spring 109 contained in the chamber 107 and is provided with a stem 110 which is adapted to operate a slide valve 111 contained in a chamber 112, which chamber, with the slide valve 111 in its normal release position, as shown in Fig. 2, is connected to the take-up cylinder 11 through a passage and pipe 113. Mounted on the back of the piston 106 is a gasket 114 which is adapted to seat on an annular seat rib 115. The slide valve 111 is at all times urged into close contact with its seat by means of a spring weighted rockable strut 116 which is interposed between the valve and casing.

Mounted in the casing of the brake cylinder control valve mechanism 5 is a combined maintaining and release control valve device 117 which is provided for the purpose of maintaining take-up cylinder pressure against leakage when an application of the brakes is effected and of controlling the release of fluid under pressure from the take-up cylinder in releasing the brakes. This valve device may comprise a flexible diaphragm 118 having at one side a chamber 119 open through a passage 120 to the atmosphere and containing a spring 121 which is interposed between and operatively engages the casing and one side of the diaphragm. At the opposite side of the diaphragm there is a chamber 122 which contains a valve 123 adapted to engage an annular seat rib 124 formed on the casing. Normally the valve is held seated by the spring 121, acting through the medium of the diaphragm, against the opposing pressure of a coil spring 125 of lesser value contained in the chamber 122. With the valve seated, the inner seated area of the valve is connected through a passage 126 to passage 113 and the outer seated area is connected through a passage 127 to a passage 128 which leads from a brake control passage 129 to the seat for the slide valve 103 of the brake cylinder control valve mechanism 5.

Associated with the emergency valve device and mounted in the casing thereof is a relay piston chamber pressure build-up control valve or inshot valve device 130 which is operative in effecting an emergency application of the brakes, only when the equipment is changed over or conditioned for freight train service, to effect the operation of the relay valve device 6 to provide an initial inshot of fluid to the brake cylinder until a predetermined brake cylinder pressure (about fifteen pounds) is developed and to then restrict the rate of flow of fluid to the brake cylinder 12, in other words, the device 130 functions to pilot the action of the relay valve device in effecting an emergency application of the brakes until such time as a timing valve 131 which is controlled through the medium of a flexible diaphragm 132 operates to provide a final inshot of fluid to effect the operation of the relay valve device to provide a final inshot of fluid to the brake cylinder.

This valve device 130 is similar in construction to the corresponding valve mechanism fully described in the aforementioned pending application, Serial No. 743,546, and briefly described, may comprise a valve 133 which is contained in a chamber 134 connected to the passage 129; there being a restriction 135 interposed in the passage at a point adjacent the chamber 134. The device also comprises a valve piston 136 having a stem 137 through the medium of which the operation of the valve 133 is controlled. Normally the valve piston 136 is maintained in sealing engagement with the casing by the action of a coil spring 138 contained in a piston chamber 139 which is connected through a passage 140 and a small volume reservoir 141 to a passage 142 leading to the seat of the emergency main slide valve 35, and when in this position the stem 137 maintains the valve 133 unseated against the action of a spring 143 tending to seat the valve.

With the valve 133 unseated, the valve chamber 134 is open to the volume reservoir 9 by way of a passage 144, a chamber 145, a passage 146 and a passage and pipe 147. The valve chamber 134 is also connected to the chamber 145 by way of a restricted passage 148. The passage 146 is connected through a choke 149 to the passage 94, so that the chamber 134 is in communication with the piston chamber 97 of the relay valve device 6.

The chamber 145 of the valve device 130 is also connected through a restricted passage 150 to a valve chamber 151 at one side of the flexible diaphragm 132 and containing the valve 131. At the other side of the diaphragm there is a chamber 152 which is connected in the usual manner through a passage 153 to the emergency slide valve chamber 37. The inner seated area of the valve 131 is exposed to a chamber 154 which is connected through a passage 155 to the valve chamber 134.

Associated with the valve device 130 is a safety valve device 156 which may be of the same construction as usually employed in universal valve devices and is for the purpose of venting fluid under pressure from the volume reservoir 9 and relay piston chamber 97 to thereby limit the brake cylinder pressure when the equipment is conditioned for passenger train service and an overreduction in brake pipe pressure is effected in making a service application of the brakes, the flow of fluid to the safety valve device being by way of chamber 139 and a passage 157 leading from the chamber. This safety valve device is set to vent fluid from said reservoir and piston chamber when the pressure therein has been increased to around sixty-three pounds. By thus limiting the pressure in the reservoir chamber, the relay valve device 6 will function to correspondingly limit the brake cylinder pressure. It will here be understood that the safety valve device only functions to limit the degree of fluid pressure build up in the volume reservoir 9 and relay piston chamber 97 in effecting a service application of the brakes with the equipment conditioned for passenger train service and is rendered inoperative by the emergency valve device when an emergency application of the brakes is initiated.

The take-up cylinder device 11 is associated with the brake cylinder 12 and may be of substantially the same construction and for the same purpose as the corresponding device disclosed in a patent to Clyde C. Farmer, No. 2,004,654, issued June 11, 1935. This device, as will hereinafter more fully appear, is adapted to operate to take up slack in the brake rigging and to move the usual brake shoes into light engagement with the car wheels before the brake cylinder 12 is caused to operate to apply braking force to the brake rigging.

The equipment also comprises a quick service modifying or limiting valve device 158 which is carried by the casing of the brake cylinder control valve mechanism 5 and is provided for the purpose of limiting the local quick service reduction in brake pipe pressure in effecting an application of the brakes with the equipment changed over or conditioned for either freight or express train operation to insure the development of a predetermined but light brake cylinder pressure upon a light reduction in brake pipe pressure being effected through the medium of the usual brake valve device, not shown. With the equipment changed over or conditioned for passenger train operation, the quick service limiting valve device, although it will operate in the same manner as when the equipment is conditioned for either freight or express train operation, will not, as will hereinafter appear, limit the quick service flow of fluid from the brake pipe, but will act to retard the rate of reduction in brake pipe pressure. This valve device may comprise a flexible diaphragm 159 which is subject on one side to the action of a spring 160 contained in a chamber 161 constantly open, through a passage 162 to the atmosphere. At the other side of the diaphragm there is a chamber 163 which is connected to the passage 92. The chamber 163 is normally open through a passage 164 to a valve chamber 165 containing a limiting valve 166 which is adapted to be seated to close communication between the chambers 163 and 165, said valve being subject to the action of a spring 167, which, acting through the medium of a plunger 168, tends to urge the valve toward its seat. Leading from the seat for the slide valve 103 of the control valve mechanism 5 is a quick service passage 169 which is connected past a check valve 170 to the chamber 165, which check valve is adapted to prevent back flow of fluid from the chamber 165, said spring 167 acting through the medium of a plunger 171 to urge the check valve toward its seat. With the brakes released the passage 169 is lapped by the slide valve 103 as shown in Fig. 2.

The equipment further comprises a quick action vent valve device 172 which is associated with the emergency valve device and is mounted in the casing thereof. This device 172 may comprise a quick action piston 173, at one side of which is a piston chamber 174 to which fluid under pressure is adapted to be supplied by way of a passage 175 when an emergency application of the brakes is initiated. At the other side of the piston there is a chamber 176 which is open to the atmosphere through an opening 177 and a passage 178 in the casing. The piston 173 is operatively connected by a stem 179 to the brake pipe vent valve 180 contained in a chamber 181 to which the brake pipe is connected through brake pipe passage 46. The valve 180 is normally maintained seated on a seat rib 182 by the action of a spring 183 contained in the valve chamber 181, and interposed between said valve and a spring seat 184 carried by the casing, thus the valve closes communication through a vent passage 185 leading from the valve chamber 181 to the atmospheric passage 178. The piston 173 is provided with the usual small vent port 186 for controlling the rate of flow of fluid from the quick action chamber to the atmosphere upon the initiation of an emergency application of the brakes.

*Control of the change-over valve mechanism*

In the present embodiment of the invention, the operation of the change-over valve mechanism to condition the equipment for either passenger, express or freight train service depends upon the pressure of fluid carried in the signal pipe 2, and due to this the signal pipe pressure will be different for each class of train service, for instance, in passenger train service it will be at the usual pressure of about forty-five pounds, in express train service it will be higher than forty-five pounds, say for instance ninety pounds, and in freight train service will be atmospheric pressure.

*Operation of the change-over control valve device to condition the change-over valve device for passenger train operation*

When a car equipped with a fluid pressure brake equipment embodying the invention is used in a passenger train, fluid under pressure supplied to the signal pipe 2 in the usual manner flows through pipe and passage 52 to the control chamber 51 of the change-over valve mechanism and flows from the passage 52 of the control chamber 55 at one side of the flexible diaphragm 50 by way of branch passage 54, a cavity 187 in the control slide valve 59 and passage 56. Fluid under pressure in chamber 55 acts to load the diaphragm 50 and thereby the combined spring seat and stop member 62 against movement in a direction toward the left hand, movement in the opposite direction being prevented by the engagement of the collar 63 of the member with an annular stop lug 188 which may be integral with the bushing 64.

When the pressure of fluid in diaphragm chamber 51 has been increased to around ten pounds, diaphragm 49 is caused to flex inwardly, i. e., in the direction toward the left hand, thereby shifting the stem 59 and associated control slide valve and spring seat 67 in the same direction, such movement being yieldably opposed by the spring 70 which acts on the left hand end of the stem through the medium of the spring seat. The movement of the diaphragm, stem, slide valve and spring seat continues until the spring seat is engaged by the stop 66 when the spring 68, acting through the medium of the members 62 and 66, brings the spring seat, stem, slide valve 60 and diaphragm 49 to a stop in the positions in which they are shown in Fig. 2.

It will here be understood that when the spring seat 67 and consequently the stem 59 and slide valve 60 are stopped as just described, these parts will be maintained in this position, by action of the springs 68 and 70 against the movement of fluid at the normal signal pipe pressure of forty-five pounds in diaphragm chamber 51 and acting on the flexible diaphragm 49.

*Initial charging of the equipment with the change-over control valve mechanism in position to condition the equipment for passenger train service*

With the change-over control valve mechanism positioned as just described and the triple and emergency valve devices in their normal release positions as shown in Fig. 2, fluid under pressure supplied to the brake pipe 1 in the usual manner flows therefrom through pipe and passage 46 and passage 47 to both the triple valve piston chamber 16 and emergency piston chamber 32.

Assuming the change-over valve device to be in position to condition the equipment for passenger train service as shown in Fig. 2 of the drawings, fluid under pressure which is being supplied to the equalizing piston chamber 16 flows from said chamber to a passage 189 past a spring weighted check valve 190 to a chamber 191 and from thence flows through a passage 192, a cavity 193 in the change-over slide valve 76 and passage and pipe 23 to the auxiliary reservoir 7. From the passage 23 fluid under pressure flows through passage 22 to the triple valve slide valve chamber 21 and from thence flows through a port 194 in the triple valve main slide valve 19, a passage 195 and a choked port 196 in the change-over slide valve 76 to the change-over slide valve chamber 77, and from thence flows through passage 78 and passage and pipe 79 to the emergency reservoir 8.

Fluid under pressure flows from the slide valve chamber 77 through passage 80 to a cavity 248 in the change-over control slide valve 60 and from thence flows through passage 84 to the piston chamber 83 of the change-over valve device. Fluid under pressure also flows from the cavity 248 through passage 89 to the chamber 88 which is located at the right hand side of the flexible diaphragm 87 of the brake cylinder build-up control valve device, fluid under pressure in the chamber 88 acting on the diaphragm 87 to maintain the valve 86 seated on the seat rib 90. Fluid under pressure in the piston chamber 83 acts on the piston 74 of the change-over valve device to maintain the said device in its conditioning position.

Fluid under pressure also flows past the triple valve piston by way of the feed groove 197 to the triple valve slide valve chamber 21 and consequently to the auxiliary reservoir and emergency reservoir. The passage 23 has interposed therein a choke 198 and, at a point intermediate this choke and the passage 22 leading to the triple valve slide valve chamber 21, is a choked passage 199 through which fluid under pressure flows from the passage 189 to the passage 23 and consequently to the auxiliary reservoir and emergency reservoir. It will here be noted that the flow of fluid to the auxiliary reservoir will be at a fairly rapid rate as controlled by the feed groove 197, choke 198, and a choked passage 199.

Fluid under pressure flows from the auxiliary reservoir passage 23 through passage 105 to the slide valve chamber 104 of the control valve device and from thence flows to the piston chamber 100 of said device by way of a passage 200, a cavity 201 in the slide valve 111 of the pilot valve device, and a passage 202.

Fluid under pressure being supplied to the emergency piston chamber 32 flows through a choked passage 203 and passage 33 to the emergency valve chamber 32 and to the quick action chamber 39.

With the several parts of the equipment in their normal release position as shown in Fig. 2, the piston chamber 97 of the relay valve device 6 is connected to the atmosphere by way of passage 96, pipe 95, passage 94, choke 149, passage 146, chamber 145 of the inshot valve device 130, passage 144, chamber 134, choke 135, passage 129, passage 128, passage 123, a cavity 204 in the slide valve 103 of the control valve device and a passage 205. The volume reservoir 9 is connected to atmosphere by way of pipe and passage 147 and passage 146, the latter passage leading to the atmosphere as just described. The take-up cylinder device 11 is connected to the atmosphere by way of pipe and passage 113, a branch passage 206, a cavity 207 in the slide valve 103 of the control valve device, a passage 208, a port 209 in the triple valve main slide valve 19, a cavity 210 in the auxiliary slide valve 20, a port 211 in the main slide valve, a restricted passage 212, a cavity 213 in the change-over slide valve 76 and a passage 214.

Fluid under pressure flows from the brake pipe to the supply reservoir 10 by way of a pipe 249, relay valve device 6 and a pipe 240.

*Service application of the brakes with the equipment conditioned for passenger train operation*

When it is desired to effect a service application of the brakes, a gradual reduction in brake pipe pressure is effected through the medium of the engineer's brake valve device, not shown, which reduction causes a corresponding reduction to be effected in the pressure of fluid in both the triple valve piston chamber 16 and the emergency piston chamber 32. The reduction in the pressure of fluid in the triple valve piston chamber will be at a faster rate than fluid under pressure can flow back thereto from the triple valve slide valve chamber 21 by way of the choked passage 199 and feed groove 197, so that the pressure of fluid in said slide valve chamber causes the triple valve piston 17 to move outwardly in a direction toward the left hand, said piston, through the medium of the piston stem 18, shifting the auxiliary slide valve 20 relative to the main slide valve 19.

As the auxiliary slide valve is thus being shifted, it laps the port 194 in the main slide valve, thus closing the communication between the valve chamber 21 and the emergency reservoir 3 and also laps the release port 209 in the main slide valve at substantially the same time as the port 194 is lapped. The tripple valve piston 17 closes communication from both the feed groove 197 and passage 189 to the piston chamber 16, so as to prevent back-flow of fluid under pressure from the auxiliary reservoir and valve chamber 21 to the piston chamber 16. After the feed groove 197 and passage 189 are thus closed, the continued movement of the piston causes the rear end of the auxiliary slide valve 20 to uncover a service port 215 in the main slide valve 19, following which, the plunger 29, mounted in the rear end of the piston stem 18 engages the rear surface 25 of the main slide valve. The further outward movement of the auxiliary slide valve by the piston and relative to the main slide valve is now resisted by the spring 31 acting through the piston stem. Now, when a predetermined light reduction in brake pipe pressure has been effected, say for instance about one pound, a sufficient fluid pressure differential is created on the piston 17, that the piston will be caused to move outwardly, overcoming the resistance offered by the spring 31 and thereby shift the auxiliary slide valve to initial quick service position. The piston 17 is very sensitive to pressure differentials and, therefore, quickly responds to a light but predetermined brake pipe reduction to move the auxiliary slide valve relative to the main slide valve to lap the ports 194 and 209 and to close the feed groove 197 and passage 189, and to then move the auxiliary slide valve to quick service position.

In the initial quick service position of the auxiliary slide valve 20, a cavity 216 in said valve connects spaced quick service ports 217 and 218 in the main slide valve. At the seat of the main slide valve, the port 217 is connected to a passage 219 leading to the triple valve piston chamber 16, and the port 218 is connected to a passage 220 leading to the seat for the slide valve 103 of the brake cylinder control valve mechanism 5. The several parts of the brake cylinder control valve mechanism will be in their normal release position as shown in Fig. 2 and a cavity 221 in the slide valve 103 thereof connects the passage 220 to a passage 222 leading to a quick service reservoir 223 of small volume, which reservoir is constantly connected to the atmosphere by way of a restricted passage 224. With the ports 217 and 218 and passages 220 and 222 thus connected, fluid under pressure is permitted to flow from the brake pipe to the quick service reservoir 223 at a fairly fast rate as governed by the flow area of the restriction 225 interposed in the passage 219, and from said reservoir is permitted to flow to the atmosphere at a slower rate by way of the passage 224, the rate of flow of fluid from the reservoir being governed by the flow of area of the restriction interposed in the passage 224.

It will be noted that the initial quick service flow of fluid from the brake pipe is at a fast rate until such time as the brake pipe pressure substantially equalizes into the reservoir 223 and then continues at a slower rate to the atmosphere. The initial flow of fluid to the reservoir produces a rapid but limited quick service reduction in brake pipe pressure for hastening the operation of the triple valve device on the next car in a train. The triple valve device on said next car then operates in a similar manner, and in this way, a quick serial response to the brake pipe reduction is transmitted from one car to the next throughout the length of the train.

After this fast but limited reduction in brake pipe pressure to the quick service reservoir, the quick service reduction is adapted to continue at the slower rate. This continued reduction is for the purpose of insuring movement of the local triple valve parts to service position.

With the auxiliary slide valve 20 in initial quick service position, a cavity 226 in the valve establishes communication between two spaced final quick service ports 227 and 228 in the main slide valve, which ports are lapped at the seat of the main slide valve. When the triple valve piston 17 and auxiliary slide valve 20 move to initial quick service position, the shoulder 24 on the piston stem 18 engages the rear surface 25 of the main slide valve 19, so that upon further movement of the piston toward service position, the main slide valve will be shifted in the same direction to service position, in which, the piston seats on the usual gasket which is interposed between the casing of the triple valve device and a clamping face of the pipe bracket 13.

As the main slide valve 19 is being shifted toward service position, the quick service ports 217 and 218 are moved out of registration with quick service passages 225 and 220 respectively, thereby closing off any further quick service flow of fluid from the brake pipe to the atmosphere by way of the quick service reservoir 223 and passage 224.

After the initial quick service flow of fluid from the brake pipe has been thus cut off, the continued movement of the main slide valve 18 causes the service port 215, which has been previously uncovered by the auxiliary slide valve, to be cracked open to the passage 208, so that fluid under pressure now starts to flow from the triple valve piston chamber 21 and connected auxiliary reservoir to the take-up cylinder 11 by way of port 215, passage 208, cavity 207 in the slide valve 103 of the brake cylinder control valve mechanism 5, passage 206 and passage and pipe 113. Fluid under pressure also flows from passage 113 to the valve chamber 112 of the pilot valve device of the brake cylinder control valve mechanism 5. Immediately following this, the port 228 is cracked open to the passage 219 and to a quick service passage 229; which passage is connected to the atmosphere by way of a port 230 in the slide valve 103, cavity 204 in said slide valve and passage 205. At the same time as the passage 228 is cracked open to the passage 229, the port 227 which is in communication with the port 228 by way of cavity 226 in the auxiliary slide valve is cracked open to a quick service passage 231 which is in communication with passage 208 by way of a spring weighted check 232, check valve chamber 233, a passage 234, a choked cavity 235 in the change-over side valve 76 and a branch 236 of passage 208. It will here be noted that since the quick service port 228 is in open communication with the passage 229, fluid under pressure is vented from the brake pipe to the atmosphere by way of the atmospheric communication established by the slide valve 103 of the brake cylinder control valve mechanism 5, and that since the quick service port 227 is in open communication with the passage 231 fluid under pressure is also vented from the brake pipe to the passage 113 and consequently to the take-up cylinder 11 and valve chamber 112 of the pilot valve device.

It will here be understood that the flow of fluid from the equalizing valve chamber 21 and connected auxiliary reservoir to the take-up cylinder 11 and pilot valve chamber 112 through the cracked open service port will be at such a slow rate that the effect of the resulting reduction in auxiliary reservoir pressure on the continued movement of the triple valve piston 17 toward service position will be negligible. The reason for thus opening the service port before permitting the final quick service flow of fluid from the brake pipe to begin is to effect a reduction in auxiliary reservoir pressure before the pressure in the take-up cylinder and chamber 112 is increased by the quick service flow of fluid. In this connection it will be noted that if the final quick service flow of fluid from the brake pipe were permitted to take place before the service port were opened and the triple valve parts should, for any reason, come to a stop before the service port is open, the quick service flow of fluid from the brake pipe would build up the fluid pressure in the take-up cylinder and chamber 112, and since no reduction in auxiliary reservoir pressure could occur, fluid under pressure could not be released from said cylinder and chamber upon an increase in brake pipe pressure. By arranging the ports in the manner just described, a reduction in auxiliary reservoir pressure will occur before the final quick service flow of fluid from the brake pipe takes place, so that the above referred to objectionable feature is not present in the equipment shown.

The triple valve piston 17 and associated slide valves 19 and 20 continue to move to the service position in which the piston seals on the gasket interposed between the casing of the triple valve device and the pipe bracket 13. With the main slide valve 19 in service position, the service port 215 is in full registration with the passage 208 and the quick service ports 228 and 227 are in full registration with passages 229 and 231 respectively.

With the main slide valve of the triple valve device in service position, fluid under pressure flows from the triple valve slide valve chamber 21 and connected auxiliary reservoir to the take-up cylinder device 11 by way of the service port 215, passage 208, cavity 207 in the slide valve 103, passage 206, and passage and pipe 113. Fluid under pressure thus supplied to the passage 113 also flows to the slide valve chamber 112 of the pilot valve device.

Fluid under pressure being thus supplied to the take-up cylinder device 11 causes the piston and stem thereof to move outwardly and actuate the brake rigging to take up the slack therein and to bring the usual brake shoes, not shown, into contact with the car wheels. The brake rigging as it is moved by the take-up cylinder draws the push rod of the brake cylinder 12 forwardly relative to the brake cylinder piston, said push rod being automatically locked, in the usual manner, by means of the well known latch box mechanism, in its outermost position with relation to the piston when the brake cylinder piston is moved outwardly by fluid under pressure supplied thereto.

When the pressure of fluid in the take-up cylinder device 11 has been increased sufficiently to cause it to function in the manner just described, the pressure of fluid in the slide valve chamber 112 of the pilot valve device, acting on that portion of the rear face of the piston 106 which is encircled by the seat rib 115, causes the piston and thereby the slide valve 111 to move outwardly against the resistance offered by the spring 109. The face of the piston 106 is provided with an annular seat rib, which rib, when the piston is moved to its outermost position, seals against a gasket clamped to the casing, so as to prevent leakage of fluid past the periphery of the piston from the valve chamber 112 to the atmosphere. It will here be understood that the pilot valve device will remain in its normal position until the pressure of fluid in chamber 112 is increased to about thirty pounds. When this pressure is attained the piston 106 moves outwardly and breaks the seal between the gasket and seat rib, whereupon the entire area of the inner face of the piston 106 is subjected to the pressure of fluid in chamber 112, and as a result the piston will move with a snap action to its extreme outer position.

The slide valve 111 of the pilot valve device, as it is being moved toward its outer position, laps the passage 113, thereby cutting off communication from the auxiliary reservoir to the valve chamber 112, and laps the passage 200, thereby cutting off the communication from the control slide valve chamber 104 and connected auxiliary reservoir to the control piston chamber 100. After the passages 113 and 200 are lapped, the cavity 201 in the slide valve 111, which remains in communication with passage 202, is brought into open communication with the passage 237 which leads to the atmosphere, so that fluid under pressure is now vented from the piston chamber 100 to the atmosphere. Further, as the slide valve 111 moves toward its extreme outer position, and just before it reaches this position, it uncovers one end of a passage 238 to the valve chamber 112, the other end of this passage having been previously connected to the triple valve slide valve chamber 21 upon movement of the triple valve main slide valve 19 to service position, so that fluid under pressure flows from the triple valve chamber and connected auxiliary reservoir to the pilot slide valve chamber 112 and maintains the pilot piston 106 and slide valve 111 in their extreme outer position.

With the piston chamber 100 of the control valve device vented to the atmosphere as just described, fluid under pressure in the control slide valve chamber 104 causes the control piston 99 to move outwardly against the opposing action of the spring 101 into sealing engagement with a gasket which is clamped to the casing, the piston in its traverse carrying with it the control slide valve 103. The slide valve 103 as it is thus being moved, laps the passage 206, thus cutting off communication from the passage 208 to the take-up cylinder device 11. At substantially the same time as the passage 206 is lapped, the cavity 207 connects passage 208 to passage 128, so that fluid under pressure now flows from passage 208 through cavity 207, passage 128, passage 129, choke 135, inshot valve chamber 134, past the unseated inshot valve 133, passage 144, chamber 145, passage 146 and passage and pipe 147 to the volume reservoir 9. From the passage 146 fluid under pressure flows through choke 149, passage 94, pipe 95 and passage 96 to the relay piston chamber 97. At substantially the same time as the cavity 207 in the control slide valve 103 connects the passages 208 and 128 together, the cavity 204 in the valve connects the quick service passages 169 and 229 together. With this latter communication established the quick service flow of fluid from the brake pipe by way of the passage 229, instead of being to the atmosphere, will be to the brake cylinder by way of cavity 204, passage 169, past the check valve 170 embodied in the quick service limiting valve device 158, through valve chamber 165, past the unseated quick service limiting valve 166 through passage 164, diaphragm chamber 163, passage 92, a cavity 239 in the change-over slide valve 76, passage 94, pipe 95 and passage 96.

Fluid under pressure supplied to the relay piston chamber 97 causes the relay piston 98 to move inwardly from the position in which it is shown in Fig. 1, and the piston as it is thus moved, causes the usual brake cylinder exhaust valve to close and the brake cylinder supply valve to open. With the supply valve open, fluid under pressure flows from the supply reservoir 10 by way of a pipe 240, relay valve device and a pipe 241 to the brake cylinder 12, causing the brake cylinder to act to apply the brakes.

Fluid under pressure flows from passage 128 through passage 127 to the diaphragm chamber 122 of the valve device 117, and when the pressure of fluid in this chamber has been increased, by such flow, to around thirty pounds, the flexible diaphragm 118, being subjected to this pressure together with the pressure of fluid acting on the inner seated area of the valve 123 will be caused to flex outwardly against the opposing pressure of the spring 121, and as a result the valve 123 will be unseated, so that fluid under pressure will flow from the passage 127 to the take-up cylinder device 11 by way of passage 126 and passage and pipe 113. This permits the relay piston chamber and take-up cylinder pressures to build up together. The valve 123 will now remain unseated until, as will hereinafter appear, the brakes are being released.

Fluid under pressure supplied to the passage 94, besides flowing to the relay piston chamber, also flows to the piston chamber 139 of the inshot valve device by way of cavity 239 in the change-over slide valve 76, passage 92, cavity 221 in the control slide valve 103, a passage 242, a cavity 243 in the emergency main slide valve 35, passage 142, volume reservoir 141 and passage 140. It will here be noted that since the flow of fluid under pressure to the chambers 139 and 145 of the inshot valve mechanism is from the auxiliary reservoir, the pressure of fluid in these chambers will increase together when a service application of the brakes is being effected, so that the spring 138 acts through the medium of the inshot piston 136 and its stem 137 to maintain the inshot valve 133 open, thus the inshot valve mechanism is rendered ineffective to vary the rate of flow of fluid under pressure to the relay piston chamber 97.

When the relay piston chamber pressure has been increased to around nine pounds fluid at brake cylinder pressure in diaphragm chamber 163 of the quick service limiting valve device 158 causes the flexible diaphragm 159 to flex toward the right hand against the opposing action of the spring 160, whereupon the spring 167 acting through the medium of the plunger 168 causes the valve 166 to seat and cut off the quick service flow of fluid from the brake pipe by way of the passage 229. The seating of the quick service limiting valve device 166 does not however cut off all of the quick service flow of fluid from the brake pipe to the relay piston chamber but does act to restrict the rate of quick service flow as governed by the flow capacity of the restricted passage 235 in the change-over slide valve 76.

When the brake pipe pressure has been reduced sufficiently to produce the desired brake application the engineer's brake valve device is moved, as is usual, to lap position. Now when the auxiliary reservoir pressure in the triple valve piston chamber 21 has been reduced by flow of fluid therefrom to the relay piston chamber and volume reservoir 9 slightly below the reduced brake pipe pressure, the triple valve piston 17 and auxiliary slide valve 20 move relatively to the main slide valve to service lap position in which the auxiliary slide valve will lap the service port 215 and thereby cut off the further flow of fluid to the relay valve device and volume reservoir, and will also lap the quick service port 227, thereby cutting off the further quick service flow of fluid from the brake pipe to the relay piston chamber and volume reservoir 9 by way of cavity 227 in the triple valve main slide valve 19.

Upon a service reduction in the pressure of fluid in the emergency piston chamber 32, the emergency piston 33 and auxiliary slide valve 36 are shifted outwardly, i. e., in the direction toward the right hand, relative to the main slide valve 35, by fluid in the emergency slide valve chamber 37. As the piston is thus shifted, it closes the communication between the piston chamber 32 and the passage 203 connected to passage 38 leading to the quick action chamber 39 and slide valve chamber 37, and at substantially the same time, the auxiliary slide valve establishes the usual atmospheric communication by way of registering ports 250 and 251 in the auxiliary and main slide valves respectively and through which fluid under pressure is vented from the valve chamber 37 and connected quick action reservoir 39 at a rate substantially equal to the service rate of reduction in the pressure of fluid in the triple valve piston chamber 32, so that the operating pressure differential on the emergency piston 33 is substantially destroyed. By reason of this, unintentional further movement of the piston and auxiliary slide valve toward emergency position is prevented.

*Brief summary of the quick service venting of fluid under pressure from the brake pipe in effecting a service application of the brakes*

It will be apparent from the foregoing description, that the equipment is capable of functioning to effect a local quick service reduction in brake pipe pressure in three stages after a reduction in brake pipe pressure has been effected through the medium of the usual brake valve device. The first stage of this local reduction is at a rapid rate to the small quick service reservoir 223, the amount of reduction on the local car being adequate to insure the movement of the triple valve device on the next car to initial quick service position, thus insuring the prompt propagation of quick service action throughout the train. The second stage of quick service reduction is due to the venting of fluid from the quick service reservoir 223 to the atmosphere by way of the choked passage 224, consequently a slow venting of fluid from the brake pipe to the atmosphere takes place, so as to reduce the brake pipe pressure sufficiently to insure movement of the local triple valve device to service position. This second stage of reduction continues until closed off by the main slide valve 19 in its traverse toward service position.

The third or final stage of reduction is from the brake pipe, first to the atmosphere and also to the take-up cylinder device 11 and pilot valve chamber 112 at a slow rate and then, upon movement of the control slide valve 103 to its cut in position, to the relay piston chamber and volume reservoir 9 at a slow rate by way of the quick service limiting valve device 158 and also by way of a communication which is not controlled by the limiting valve device. When the pressure of fluid in the relay piston chamber and volume reservoir has been increased to around nine pounds, the quick service limiting valve device functions to effect a reduction in the rate of flow of fluid from the brake pipe. This final reduction in brake pipe pressure begins before the triple valve piston 17 and slide valves 19 and 20 are in service position and therefore contributes to the prompt movement of the triple valve parts to service position and continues as long as the triple valve slide valves are in service position and is for the purpose of insuring the triple valve parts remaining in service position until the desired brake cylinder pressure is obtained. It will be understood that the final reduction is also for the purpose of smoothing out or dampening surges which may have been created in the fluid under pressure in the brake pipe and is at a slow rate so as not to create other detrimental surges in the brake pipe fluid.

*Release of the brakes after a service application with the equipment conditioned for passenger train operation*

To effect a release of the brakes after a service application, fluid under pressure is supplied to the brake pipe 1 and flows therefrom to the triple valve piston chamber 16 and emergency piston chamber 32 in the same manner as has hereinbefore been described in connection with the initial charging of the equipment.

To initiate the release of the brakes, it is customary to first move the brake valve to release position, in which fluid under pressure is supplied directly from the main reservoir, not shown, to the brake pipe, and then, after a predetermined interval of time has elapsed, to move the brake valve to running position, in which fluid at feed valve pressure is supplied to the brake pipe.

The initial supply of fluid at high pressure to the brake pipe rapidly increases the brake pipe pressure, the high head of pressure at the front end of the train being adapted to cause a rapid flow of fluid under pressure toward the rear of the train, so as to accelerate the release of the brakes and the recharging of the brake equipment on the cars at the rear end of the train.

The rapid increase in the brake pipe pressure creates a pressure differential on the triple valve piston 17 which causes the piston and thereby the slide valves 19 and 20 to promptly move to their normal release position in which they are shown in Fig. 2. With the piston 17 in this position the feed groove 197 and feed passage 189 are open, so that fluid under pressure is permitted to flow at a restricted rate from the piston chamber 16 through both the feed groove 197 and feed passage 189 to the triple valve slide valve chamber 21 and auxiliary reservoir 7.

Further, with the triple valve parts in release position, fluid under pressure is supplied at a restricted rate from the fully charged emergency reservoir to the triple valve slide valve chamber 21 and auxiliary reservoir 7 by way of pipe and passage 79, passage 78, change-over slide valve chamber 77, restricted port 196 in the change-over slide valve 76, passage 195 and port 194 in the triple valve main slide valve 19. Due to the restricting of the flow of fluid from the brake pipe to the triple valve slide valve chamber and auxiliary reservoir and the flow of fluid thereto from the fully charged emergency reservoir, the amount of fluid taken from the brake pipe will not be great, so that more fluid will flow toward the rear of the train, thus hastening the recharge of the brake pipe on cars at the rear end of the train.

The restricted port 196 in the change-over slide valve 76 limits the rate at which fluid flows from the emergency reservoir to such an extent that after the brake valve is moved from release position to running position, and the brake pipe pressure on the cars drops to or below that supplied by the feed valve device at the locomotive, the pressure of fluid in the triple valve slide valve chamber will be less than the brake pipe pressure in piston chamber 27. By reason of this, unintentional movement of the equalizing valve parts from a release position to quick service or service position in releasing the brakes is prevented.

With the triple valve slide valves in release position, fluid under pressure is vented from the relay piston chamber 97 to the atmosphere by way of passage 96, pipe 95, passage 94, choke 149, passage 146, chamber 145 of the inshot valve device 130, passage 144, past the open inshot valve 133, valve chamber 134, choke 135, passages 129 and 128, cavity 207 in the control slide valve 103, passage 206, cavity 209 in the triple valve main slide valve 19, cavity 210 in the triple valve auxiliary slide valve 20, port 219 in the main slide valve 19, passage 212, cavity 213 in the change-over slide valve 76 and passage 214. Since the volume reservoir 9 is in open communication with the passage 146 by way of pipe and passage 147, fluid under pressure is vented from said reservoir through the communication just traced, which leads from the passage 146 to the atmosphere.

At the same time as fluid under pressure is being vented from the relay piston chamber 97 and volume reservoir 9, fluid under pressure is vented from the take-up cylinder device 11 by way of pipe and passage 113, passage 126, past the unseated valve 123, passage 127 and the communication, just traced, which leads from the passage 128 to the atmosphere. Now when the pressure of the take-up cylinder device 11 and relay piston chamber has been reduced, by the venting of fluid therefrom, as just described, to around thirty pounds, the valve 123 will be moved into seating engagement with the seat rib 124 by the action of the spring 121 and will thereby cut off the flow of fluid from the take-up cylinder device 11 by way of passage 127 and communications therefrom to the atmosphere.

With the triple valve main slide valve 19 in release position, the passage 238 is in registration with the port 209 in the slide valve, so that fluid under pressure is vented from the valve chamber 112 of the pilot valve device with the fluid under pressure being vented from the relay piston chamber 97. Now when the pressure of fluid in the relay piston chamber 97 and consequently in the slide valve chamber 112 of the pilot valve device has been reduced to a low degree, say, for instance, to about five pounds, the spring 109 acts to cause the piston of the pilot valve device to move inwardly to its innermost position in which the gasket 114 seats upon the annular seat rib 115. The piston acting through the medium of the stem 110 shifts the slide valve 111 to its inner position in which, the cavity 201 in the valve establishes communication from the passage 200 to the passage 202, so that fluid under pressure is supplied from the control slide valve chamber 104 to the control piston chamber 106. The pressures of fluid acting on the opposite sides of the control piston 99 will equalize quickly, so that the spring 101 acts to shift the piston and thereby the control slide valve 103 to their normal release position as shown in Fig. 2 of the drawings.

With the control slide valve 103 in this position, fluid under pressure being vented from the relay valve piston chamber 97 and volume reservoir by way of passage 128, flows through cavity 204 in the slide valve and passage 205 to the atmosphere.

Further, with the slide valve 103 in this position, the cavity 207 therein establishes communication from the passage 206, leading from the take-up cylinder device 11, to the passage 208, so that fluid under pressure is vented from the take-up cylinder device by way of port 209 in the triple valve main slide valve 19, cavity 210 in the auxiliary slide valve 20, port 211 in the main slide valve, restricted passage 212, cavity 213 in the change-over slide valve 76 and passage 214.

It will here be noted that when the slide valve 111 of the pilot valve device moves to its inner or release position the passage 113 leading from the take-up cylinder device 11 is connected to the slide valve chamber 112, so that fluid under pressure from the take-up cylinder device equalizes into said chamber, but the equalized pressure acting on the inner seated area of the rear face of the piston is insufficient to cause the piston to move outwardly against the opposing pressure of the springs 109, so that the piston and slide valve will remain in their inner position. Since the passage 113 is connected to the atmosphere the chamber 97 will be vented with the take-up cylinder device.

With the control slide valve 103 in its inner or release position, fluid under pressure is vented from the piston chamber 139 of the inshot valve device by way of passage 140, volume chamber 141, passage 142, cavity 243 in the emergency main slide valve, passage 242, a laterally extending cavity 246 in the control slide valve 103, a passage 247, port 209 in the triple valve main slide valve and the atmospheric communication from said port 209.

Upon the venting of fluid under pressure from the volume reservoir 9 and relay piston chamber 97, the relay valve device 6 will function to vent fluid under pressure from the brake cylinder 12 in identically the same manner as the corresponding device does in the equipment disclosed in the aforementioned pending application of Clyde C. Farmer and Ellis E. Hewitt, Serial No. 743,546.

Further, with the control slide valve 103 in release position the cavity 221 therein establishes communication between the quick service passages 220 and 222.

It will be understood that by delaying the release operation of the take-up cylinder device until after the brake cylinder pressure has been reduced to a low degree and then reducing the brake cylinder pressure at a rate faster than that of the reduction in the take-up cylinder pressure, the automatic unlatching operation of the latch box mechanism, carried by the brake cylinder, will be insured before such mechanism is subjected to the releasing action of the take-up cylinder device, thus eliminating the possibility of damage to the latch mechanism by the take-up cylinder device.

The increase in brake pipe pressure to effect the release of the brakes causes the emergency piston 33 and thereby the auxiliary slide valve 36 to move to their normal release position in which they are shown in Fig. 2 of the drawings.

*Graduated release of the brakes with the equipment conditioned for passenger train operation*

In passenger train operations it is very desirable to reduce the brake cylinder pressure in steps or increments, in other words to graduate the release of the brakes.

Assuming the several parts of the equipment to be in service position, as hereinbefore described, and it is desired to graduate the release of the brakes, the brake valve is first moved to release position to quickly increase the brake pipe pressure sufficiently to cause the parts of the equipment to move to release position, and is then moved to lap position, in which the flow of fluid from the main reservoir to the brake pipe is closed off.

With the several parts of the equalizing valve device in release position, fluid under pressure is vented from the volume reservoir 9 and relay piston chamber 97 in the same manner as has already been described in connection with the full or complete release of the brakes. This causes the relay valve device 6 to operate to initiate a reduction in brake cylinder pressure. With the brake valve in lap position, it is obvious that there will be no further increase in brake pipe pressure and as a result of this the pressure of fluid in the triple valve slide valve chamber 21 will be increased by the flow of fluid from the fully charged emergency reservoir. When the pressure in valve chamber 21 slightly exceeds the brake pipe pressure in the triple valve piston chamber 16, fluid under pressure in said chamber 21 causes the piston and thereby the auxiliary slide valve 20 to move outwardly relative to the main slide valve. The piston and slide valve move but a very short distance when the slide valve laps the port 194 in the main slide valve and thereby closes off the flow of fluid to the valve chamber 21, and since, with the port 194 closed, no further increase in the pressure of fluid in the valve chamber will be effected, the triple valve piston and auxiliary slide valve will either come to a stop or have a tendency to do so.

In practice it has been found that when the brake valve is moved from release position to lap position in graduating the release of the brakes, the reduction in brake pipe pressure on the head cars of the train caused by the flow of fluid from said cars toward the rear of the train is such as to permit the pressure of fluid in the triple valve slide valve chamber to unintentionally move the triple valve piston and auxiliary slide valve to initial quick service position, the fluid pressure differential created on said piston being sufficient to overcome the resistance offered by the spring 31 and plunger 29. It will be noted that when the auxiliary valve assumes this position, the control slide valve 103 is in its uppermost or application position in which the initial quick service communication from the triple valve device to the quick service chamber 223 and the atmosphere is cut off so that no quick service flow of fluid from the brake pipe is permitted. If this quick service communication were permitted to remain open in graduating the release of the brakes quick service action would be propagated throughout the length of the train and as a result would cause an application of the brakes to be effected when the release of the brakes is intended. With the quick service communication cut off by the control slide valve the possibility of this undesirable action is eliminated.

At substantially the same time as the port 194 is lapped, the auxiliary slide valve also laps the port 209 in the main slide valve 19 and thus closes off the exhaust flow of fluid from the volume reservoir 9 and relay piston chamber 97. Now when the brake cylinder pressure has been reduced slightly below the reduced relay piston chamber pressure, the relay valve device 6 is caused to operate to close the brake cylinder exhaust communication to the atmosphere. Since, with the brake cylinder exhaust communication closed, no further reduction in brake cylinder pressure occurs, the several movable parts of the relay valve device come to a stop.

When it is desired to make another step of reduction in brake cylinder pressure, the brake valve may be moved from lap to running position and when the desired reduction in brake cylinder pressure is attained, the brake valve is returned to lap position. The increase in brake pipe pressure effected upon movement of the brake valve to running position causes the triple valve piston 17 and thereby the auxiliary slide valve 20 to be shifted to release position, in which the ports 194 and 209 are again opened to the triple valve chamber 21 and the passage 211, respectively, the opening of the port 194 permitting the flow of fluid from the emergency reservoir to the valve chambers and the opening of the port 209 permitting fluid under pressure to flow from the volume reservoir 9 and relay piston chamber 97 to the atmosphere, the resulting reduction in the relay piston chamber causing the relay valve device to operate to effect the corresponding reduction in brake cylinder pressure. With the brake valve in lap position the triple valve piston and auxiliary slide valve will again move to close off the flow of fluid from the volume reservoir and relay piston chamber, so that the relay valve device will be caused to operate to close off the flow of fluid from the brake cylinder to the atmosphere.

It will be understood that by means of the brake valve, the triple valve device and relay valve device may be caused to operate to reduce the brake cylinder pressure in as many successive steps as desired, until such time as the emergency reservoir pressure equalizes into the auxiliary reservoir. After such equalization any further increase in brake pipe pressure moves the triple valve piston and auxiliary slide valve to release position, where they remain until the brakes are completely released.

*Conditioning the change-over valve device for express and freight train operations and operation of the equipment in express and freight train operations*

The operation of the change-over control valve device and change-over valve device to condition the brake equipment for express and freight train operations is substantially the same as that of the corresponding devices described in the aforementioned pending application of Clyde C. Farmer and Ellis E. Hewitt, Serial No. 94,372.

Figures 3, 4:
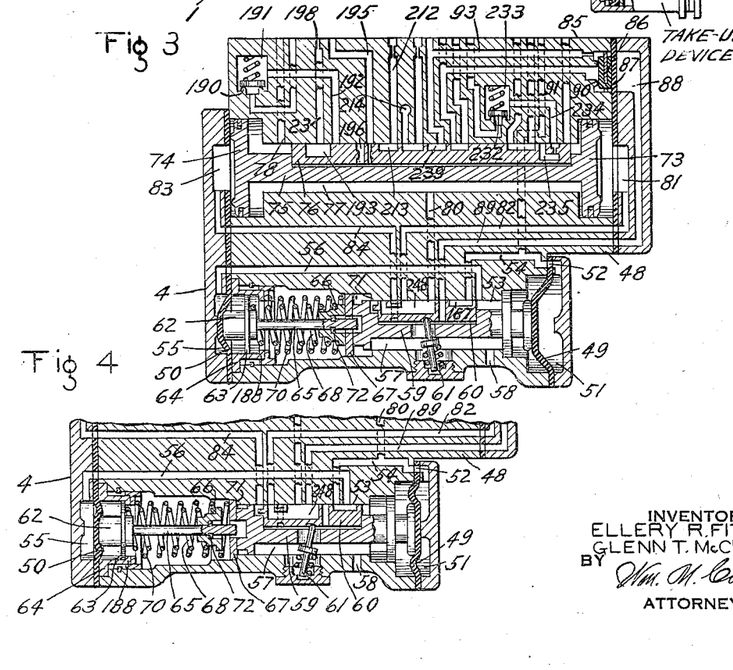
Fig. 3 is a fragmentary sectional view showing the change-over valve mechanism in position for conditioning the equipment for express train service.
Fig. 4 is a fragmentary sectional view showing a portion of the change-over valve mechanism in the position it assumes to condition the equipment for freight train service.

It will here be understood that the slide valve 76 of the change-over valve device will be caused to move to the position in which it is shown in Fig. 3 for either express or freight train operations and that the control valve device therefore assumes different positions as shown in Figs. 3 and 4. In Fig. 3 the control valve device is shown in position to cause the control valve device to move to express train position and in Fig. 4 is shown in position to cause the control valve device to move to freight train position.

The slide valve 76 in its change-over position for express or freight train operations laps the passage 236 so that when the triple valve device moves to its final quick service position there will be no quick service flow of fluid from the brake pipe to the take-up cylinder. There will however be a quick service flow of fluid from the brake pipe first to the atmosphere by way of the restricted passage 229, cavity 230 in the control slide valve 103, cavity 204 in the slide valve and passage 205 until such time as the control slide valve is caused to move to its outermost position in which the cavity 204 is out of communication with the atmospheric passage 205 and connects the quick service passages 229 and 169 together. With the passages 229 and 169 thus connected together fluid under pressure is vented from the brake pipe to the volume reservoir 9 and relay piston chamber 97 until such time as the pressure of fluid in said reservoir and chamber has been increased to around nine pounds when the quick service limiting valve device 158 operates to close off the further quick service flow of fluid from the brake pipe.

From this it will be seen that the quick service flow of fluid from the brake pipe to the atmosphere begins as soon as the quick service port 228 in the triple valve main slide valve is opened to the quick service passage 229 and continues until the atmospheric passage 205 is lapped by the control slide valve 103. At substantially the same time as the passage is lapped the cavity 204 in the control slide valve connects the quick service passages 229 and 169 together so that the quick service flow of fluid is to the brake cylinder, such flow continuing until cut off by the quick service limiting valve device 158 when the brake cylinder pressure has been increased to around nine pounds.

Other operations of the brake equipment will be substantially the same as that of the equipment covered in the Farmer and Hewitt application, Serial No. 94,372 and since these operations have been described in detail in said application it is deemed unnecessary to describe them in the present application.

Having now described our invention, what we claim as new and desire to secure by Letters Patent, is:

1. In a fluid pressure brake, in combination, a brake pipe, a brake controlling valve device operative upon a reduction in brake pipe pressure first to a quick service position to effect a local reduction in brake pipe pressure and then to an application position to effect an application of the brakes and operative upon a subsequent increase in brake pipe pressure in steps or increments to graduate the release of the brakes, means operative for rendering the brake controlling valve device ineffective to effect a reduction in brake pipe pressure when, in graduating the release of the brakes, the brake controlling valve device assumes said quick service position, and valve means operative upon movement of the brake controlling valve device from said quick service position to application position for effecting the operation of said means.

2. In a fluid pressure brake, in combination, a brake pipe, a brake controlling valve device operative upon a reduction in brake pipe pressure first to a quick service position to effect a local reduction in brake pipe pressure and then to an application position to effect an application of the brakes and operative upon a subsequent increase in brake pipe pressure in steps or increments to graduate the release of the brakes, means responsive to variations in fluid pressures for rendering the device ineffective to effect a reduction in brake pipe pressure when, in graduating the release of the brakes, the device assumes said quick service position, and means responsive to fluid under pressure supplied thereto by the brake controlling valve device when the device is in application position for effecting the operation of said means.

3. In a fluid pressure brake, in combination, a brake pipe, a brake controlling valve device operative upon a reduction in brake pipe pressure first to a quick service position to establish a communication through which fluid under pressure is adapted to be vented from the brake pipe and then to an application position to effect an application of the brakes and operative upon a subsequent increase in brake pipe pressure in steps or increments to graduate the release of the brakes, fluid pressure responsive means operative for closing said communication for rendering the brake controlling valve device ineffective to vent fluid under pressure from the brake pipe when, in graduating the release of the brakes, the brake controlling valve device assumes its communication establishing position, and valve means operative upon movement of the brake controlling valve device to said application position for effecting the operation of said fluid pressure responsive means.

4. In a fluid pressure brake, in combination, a brake pipe, a brake controlling valve device operative upon a reduction in brake pipe pressure to first establish a quick service communication through which fluid under pressure is locally vented from the brake pipe and to then establish a communication through which fluid under pressure is supplied to effect an application of the brakes, and operative upon a subsequent increase in brake pipe pressure in steps or increments alternately to release and release lap position to graduate the release of the brakes, means subject to opposing fluid pressures and responsive to one of said fluid pressures for closing said communication to thereby render the device ineffective to effect a reduction in brake pipe pressure, when in graduating the release of the brakes, the device moves beyond said release lap position and assumes said quick service position, and means responsive to fluid under pressure supplied thereto by said brake controlling valve device when the device is in application position for effecting the operation of said means.

5. In a fluid pressure brake, in combination, a brake pipe, a brake controlling valve device operative upon a reduction in brake pipe pressure to first effect a local quick service reduction in brake pipe pressure and to then effect an application of the brakes and operative upon a subsequent increase in brake pipe pressure in steps or increments to effect a graduated release of the brakes, a valve normally establishing communication through which the quick service reduction in brake pipe pressure is effected, means subject to opposing fluid pressures and responsive to a reduction in one of the pressures for closing said communication to thereby render the device ineffective to effect a reduction in brake pipe pressure when, in graduating the release of the brakes the device assumes quick service venting position, and means responsive to the pressure of fluid supplied thereto by the brake controlling valve device when the device is in application position for effecting the operation of said means.

6. In a fluid pressure brake, in combination, a brake pipe, a brake controlling valve device operative upon a reduction in brake pipe pressure first to a quick service position to effect a local reduction in brake pipe pressure and then to an application position to effect a further local reduction in brake pipe pressure and to effect an application of the brakes and operative upon a subsequent increase in brake pipe pressure in steps or increments to graduate the release of the brakes, means operative for rendering said device ineffective to effect a reduction in brake pipe pressure when in graduating the release of the brakes the brake controlling valve device assumes said quick service position, and valve means upon movement of the brake controlling valve device to application position for effecting the operation of said valve means.

7. In a fluid pressure brake, in combination, a brake pipe, valve means operative upon a reduction in brake pipe pressure for first establishing a quick service communication through which fluid under pressure is vented from the brake pipe and for then closing said quick service communication and establishing a communication through which fluid under pressure is supplied to effect an application of the brakes and operative upon a subsequent increase in brake pipe pressure for effecting a release of the brakes, means subject to opposing pressures and operative upon a reduction of one of said pressures for preventing the flow of fluid through said quick service communication when in effecting the release of the brakes said valve means assumes its brake pipe venting position, and a valve device controlled by said valve means for effecting the operation of said means.

8. In a fluid pressure brake, in combination, a brake pipe, valve means operative upon a reduction in brake pipe pressure for first establishing a quick service communication through which fluid under pressure is vented from the brake pipe and for then closing said quick service communication and establishing a communication through which fluid under pressure is supplied to effect an application of the brakes and operative upon a subsequent increase in brake pipe pressure for effecting a release of the brakes, means operable to prevent the quick service flow of fluid from the brake pipe through said quick service communication when in releasing the brakes said valve means assumes its brake pipe venting position, and a valve device operative by fluid under pressure supplied by said valve means when the valve means is in brake application position for effecting the operation of said means.

9. In a fluid pressure brake, in combination, a brake pipe, valve means operative upon a reduction in brake pipe pressure for first establishing a quick service communication through which fluid under pressure is vented from the brake pipe and for then closing said communication and establishing a communication through which fluid under pressure is supplied to effect an application of the brakes and operative upon a subsequent increase in brake pipe pressure for effecting a release of the brakes, means operative to a position to close said quick service communication to thereby prevent the quick service flow of fluid from the brake pipe when in releasing the brakes said valve means assumes brake pipe venting position, and a valve device operative by fluid under pressure supplied by said valve means in effecting an application of the brakes for effecting the operation of said means.

10. In a fluid pressure brake, in combination, a brake pipe, valve means operative upon a reduction in brake pipe pressure for first establishing a quick service communication through which fluid under pressure is vented from the brake pipe, for then closing said communication and for establishing a communication through which fluid under pressure is supplied to effect an application of the brakes and operative upon a subsequent increase in brake pipe pressure for effecting a release of the brakes, a control valve device operative for also closing said communication to prevent the venting of fluid from the brake pipe in the event of the movement of said valve means to brake pipe venting position in effecting the release of the brakes, and a pilot valve device operative upon a predetermined increase in the pressure of fluid supplied by said valve means in effecting an application of the brakes for effecting the operation of said control valve device.

11. In a fluid pressure brake, in combination, a brake pipe, valve means operative upon a reduction in brake pipe pressure for first establishing a quick service communication through which fluid under pressure is vented from the brake pipe, for then closing said communication and for establishing a communication through which fluid under pressure is supplied to effect an application of the brakes and operative upon a subsequent increase in brake pipe pressure for effecting a release of the brakes, means subject to opposing fluid pressures and operative upon a reduction in one of said pressures for also closing said communication to prevent the venting of fluid from the brake pipe in the event of the movement of said valve means to brake pipe venting position in effecting the release of the brakes, said means being operative upon substantially the complete release of the brakes to its communication open position, and a valve device operative upon a predetermined increase in the pressure of fluid supplied by said valve means in effecting an application of the brakes for reducing said pressure to effect the operation of said means.

12. In a fluid pressure brake, in combination, a brake pipe, valve means operated upon a reduction in brake pipe pressure to first vent fluid under pressure from the brake pipe to then cut off the venting of fluid from the brake pipe and then supply fluid under pressure to effect an application of the brakes, a valve normally establishing communication through which fluid under pressure vented from the brake pipe is adapted to flow and operative to close said communication, and means responsive to the pressure of fluid supplied by said valve means in effecting an application of the brakes to effect a reduction in fluid pressure to cause said fluid pressure responsive means to operate to actuate said valve to close said communication.

13. In a fluid pressure brake, in combination, a brake pipe, a quick service reservoir, valve means operated upon a reduction in brake pipe pressure for first venting fluid under pressure from said brake pipe to said reservoir to effect a local reduction in brake pipe pressure and for then cutting off the venting of fluid from the brake pipe and for supplying fluid under pressure to effect an application of the brakes, and means normally establishing communication through which fluid under pressure vented from the brake pipe by said valve means flows to said reservoir and a movable abutment subject to opposing fluid pressures and operative upon the venting of fluid from one side thereof to actuate said means and a valve device operative by fluid under pressure supplied by said valve means, in effecting an application of the brakes, to vent fluid under pressure from said side of said abutment.

14. In a fluid pressure brake, in combination, a brake pipe, a quick service reservoir, valve means operated upon a reduction in brake pipe pressure for first venting fluid under pressure from said brake pipe to said reservoir to effect a local reduction in brake pipe pressure and for then cutting off the venting of fluid from the brake pipe and supplying fluid under pressure to effect an application of the brakes, and fluid pressure responsive means interposed between said valve means and reservoir normally establishing communication through which fluid under pressure vented from the brake pipe by said valve means flows to said reservoir and operative upon a reduction in fluid pressure acting thereon to close said communication, and means responsive to the pressure of fluid supplied by said valve means in effecting an application of the brakes for reducing the pressure of fluid acting on said means.

15. In a fluid pressure brake, in combination, a brake pipe, a quick service reservoir, valve means operated upon a reduction in brake pipe pressure for first venting fluid under pressure from said brake pipe to said reservoir to effect a local reduction in brake pipe pressure and for then cutting off the venting of fluid from the brake pipe and supplying fluid under pressure to effect an application of the brakes, and means interposed between said valve means and reservoir normally establishing communication through which fluid under pressure vented from the brake pipe by said valve means flows to said reservoir, means subject to opposing fluid pressures and operative upon a reduction in one of said pressures to close said communication said means being adapted to maintain said communication closed during the release of the brakes, and means operative by fluid under pressure supplied by said valve means in effecting an application of the brakes for effecting the operation of said means.

16. In a fluid pressure brake, in combination, a brake pipe, a take-up cylinder device, a passage through which fluid under pressure is adapted to be supplied to effect an application of the brakes, a brake controlling valve device operative upon a reduction in brake pipe pressure to vent fluid under pressure from the brake pipe and to supply fluid under pressure to said take-up cylinder device, and valve means normally establishing communication through which fluid under pressure vented from the brake pipe flows and another communication through which fluid supplied by the brake controlling valve device flows to the take-up cylinder device and operative upon an increase in take-up cylinder pressure to close both of said communications and to establish another communication through which fluid under pressure supplied by said brake controlling valve device flows to said passage and also to the take-up cylinder device, the communication through which fluid under pressure is vented from the brake pipe being closed to prevent undesired venting of fluid from the brake pipe in the event of movement of the brake controlling valve device to its brake pipe venting position in releasing the brakes.

17. In a fluid pressure brake, in combination, a brake pipe, a take-up cylinder device, a passage through which fluid under pressure is adapted to be supplied to effect an application of the brakes, a brake controlling valve device operative upon a reduction in brake pipe pressure to vent fluid under pressure from the brake pipe and to supply fluid under pressure to said take-up cylinder device, and valve means normally establishing communication through which fluid under pressure vented from the brake pipe flows and another communication through which fluid supplied by the brake controlling valve device flows to the take-up cylinder device and operative upon an increase in take-up cylinder pressure to close both of said communications and to establish another communication through which fluid under pressure supplied by said brake controlling valve device flows to said passage and also to the take-up cylinder device, the communication through which fluid under pressure is vented from the brake pipe being closed to prevent undesired venting of fluid from the brake pipe in the event of movement of the brake controlling valve device to its brake pipe venting position in releasing the brakes, said brake controlling valve device being operative upon increasing the brake pipe pressure in steps or increments to graduate the release of the brakes and said valve means being maintained in its communication closing position to prevent fluid under pressure from being vented from the brake pipe when in graduating the release of the brakes the brake controlling valve device moves to its brake pipe venting position.

18. In a fluid pressure brake, in combination, a brake pipe, a take-up cylinder device, a passage through which fluid under pressure is adapted to be supplied to effect an application of the brakes, a brake controlling valve device operative to brake application position to supply fluid under pressure to the take-up cylinder device and at the same time to vent fluid under pressure from the brake pipe, and valve means normally establishing communication through which fluid under pressure supplied by the brake controlling valve device flows to the take-up cylinder device and another communication through which fluid vented from the brake pipe flows to the atmosphere and operative upon an increase in take-up cylinder pressure for cutting off the flow of fluid to the take-up cylinder and the flow of fluid vented from the brake pipe to the atmosphere and for then establishing communication through which fluid supplied by the brake controlling valve device flows to said passage for establishing another communication through which fluid vented from the brake pipe flows to said passage.

19. In a fluid pressure brake, in combination, a brake pipe, a take-up cylinder device, a passage through which fluid under pressure is adapted to be supplied to effect an application of the brakes, a brake controlling valve device operative to brake application position to supply fluid under pressure to the take-up cylinder device and at the same time to vent fluid under pressure from the brake pipe, valve means normally establishing communication through which fluid under pressure supplied by the brake controlling valve device flows to the take-up cylinder device and another communication through which fluid vented from the brake pipe flows to the atmosphere and operative upon an increase in take-up cylinder pressure for cutting off the flow of fluid to the take-up cylinder and the flow of fluid vented from the brake pipe to the atmosphere and for then establishing communication through which fluid supplied by the brake controlling valve device flows to said passage for establishing another communication through which fluid vented from the brake pipe flows to said passage, and means operative upon the attainment of a predetermined pressure in said passage for cutting off the flow of fluid from the brake pipe to the passage.

20. In a fluid pressure brake, in combination, a brake pipe, a take-up cylinder device, a passage through which fluid under pressure is adapted to be supplied to effect an application of the brakes, a brake controlling valve device operative to brake application position to supply fluid under pressure to the take-up cylinder device and at the same time to vent fluid under pressure from the brake pipe, valve means normally establishing communication through which fluid under pressure supplied by the brake controlling valve device flows to the take-up cylinder device and another communication through which fluid vented from the brake pipe flows to the atmosphere and operative upon an increase in take-up cylinder pressure for cutting off the flow of fluid to the take-up cylinder and the flow of fluid vented from the brake pipe to the atmosphere and for then establishing communication through which fluid supplied by the brake controlling valve device flows to said passage for establishing another communication through which fluid vented from the brake pipe flows to said passage, and valve means responsive to fluid under pressure in said passage for limiting the amount of fluid vented from the brake pipe to the passage.

21. In a fluid pressure brake, in combination, a brake pipe, a brake controlling valve device operative upon a reduction in brake pipe pressure to first vent fluid under pressure from the brake pipe, to then terminate such venting, and to then supply fluid under pressure to effect an application of the brakes and to vent fluid under pressure from the brake pipe, valve means normally establishing communication through which fluid first vented from the brake pipe flows and a communication through which fluid being finally vented from the brake pipe initially flows to the atmosphere, said valve means being operative to close both of said communications and to establish another communication through which the final venting of fluid from the brake pipe is continued, means operative by fluid under pressure supplied by the brake controlling valve device for effecting the operation of said valve means, and valve means operative by fluid under pressure supplied by the brake controlling valve device for limiting the flow of fluid from the brake pipe by way of the last mentioned communication, said brake controlling valve device being responsive to steps or increments of increase in brake pipe pressure for graduating the release of the brakes, and said valve means being adapted to remain in the position to which it has been operated during the graduated release of the brake to prevent the venting of fluid from the brake pipe when in releasing the brakes the brake controlling valve device moves to its first mentioned venting position.

ELLERY R. FITCH.
GLENN T. McCLURE.

CERTIFICATE OF CORRECTION.

Patent No. 2,106,480.　　　　　　　　　　　　　　January 25, 1938.

ELLERY R. FITCH, ET AL.

It is hereby certified that error appears in the printed specification of the above numbered patent requiring correction as follows: Page 13, second column, line 10, claim 8, for the word "operable" read operative; page 14, first column, line 19, claim 12, before "and" insert fluid pressure responsive means operative upon a reduction in fluid pressure for effecting the operation of said valve; and that the said Letters Patent should be read with these corrections therein that the same may conform to the record of the case in the Patent Office.

Signed and sealed this 15th day of March, A. D. 1938.

Henry Van Arsdale,
Acting Commissioner of Patents.

(Seal)